Jan. 15, 1929.

M. T. DENNE 1,698,910

MACHINE FOR PRESSING OR LEVELING THE SOLES OF BOOTS AND SHOES

Filed Dec. 24, 1925

INVENTOR
M. T. Denne
BY
Chas Bauer
ATTORNEY

Jan. 15, 1929.

M. T. DENNE

1,698,910

MACHINE FOR PRESSING OR LEVELING THE SOLES OF BOOTS AND SHOES

Filed Dec. 24, 1925   9 Sheets-Sheet 5

INVENTOR
M. T. Denne
BY
Chas Bauer
ATTORNEY

Patented Jan. 15, 1929.

1,698,910

UNITED STATES PATENT OFFICE.

MARK THOMAS DENNE, OF LONDON, ENGLAND.

MACHINE FOR PRESSING OR LEVELING THE SOLES OF BOOTS AND SHOES.

Application filed December 24, 1925, Serial No. 77,540, and in Great Britain December 30, 1924.

This invention has reference to improvements in machines for pressing or leveling the soles of boots and shoes (both hereinafter included in the term shoes) and particularly to that class or type of machine in which a rotary work pressing form is provided to which and a shoe support relative movement is imparted in the direction so that the shoe sole is subjected to a rolling pressure by the form.

The main objects of my invention are to facilitate the sole pressing or leveling operation; to reduce the stress to which the machine is subjected for a given total pressure brought to bear over the whole area of the shoe sole; and generally to improve the construction of machines of the class defined. Other objects of my invention will hereinafter be referred to.

A defect inherent in machines of the class defined as heretofore constructed is that when adjusted to exert a certain pressure upon one shoe, the same pressure is not exerted on the shoe next operated on, even though this be of exactly the same size and shape.

In every day factory practice it is not possible to effect such an exact adjustment successively of all the shoes of a number or series on the shoe support, to ensure that the relative position of the shoe sole and the form is the same for all the shoes of a series and which relative position of all the shoes with the form is essential to the attainment of equality of pressure. It is necessary therefore in said machines to adjust the shoe support to overcome this difficulty and consequently said support must be adjusted practically for every shoe.

This very frequent adjustment of the work support not only entails a considerable total amount of work on the part of the operator during a full day's operation of the machine, but it also necessitates the employment of a fairly skilled workman to effect as nearly as may be the correct adjustment, for the purpose stated, of every shoe, and, further, the total amount of time thus expended in adjusting the parts during a full day's operation is very considerable and the output of the machine correspondingly reduced.

The said disadvantages and difficulties are obviated by my invention, an important feature of which is the provision, in a machine of the class defined, of means whereby the adjustment, relatively to each other, of the form and the work, is automatically effected so that the same degree or amount of pressure that is brought to bear on the sole of the first shoe of a series will be brought to bear on all subsequent shoes the soles of which are to be subjected to the same pressure, notwithstanding variations in the adjustment of successive shoes on the support or variations in their sizes.

To this end my invention includes the provision, for a machine of the class defined, of an adjustable feeler that contacts with or rides on the uneven surface of the shoe sole, as the shoe is moved towards the form, and is actuated thereby to move it to a position determined by the most elevated part (usually about midway of the forepart) of the sole, and which feeler during its movement effects the adjustment relatively to each other of the form and the work on its support, for instance by adjusting the position of the form.

The extreme position in one direction of the feeler is that in which, when it has effected the adjustment of the form, the latter will merely make rolling contact with the shoe when brought into and moved in the work pressing position. That is to say the form will not exert pressure on the sole.

If, however, the relative position of the feeler and the form be changed with relation to the plane of movement of the sole when being pressed or leveled, for instance by adjusting the position of the feeler, the form will exert a more or less considerable pressure on the shoe sole when in operative connections therewith, the degree of pressure depending upon the extent of such adjustment. The operator is thus enabled to adjust the parts according to the degree of pressure he desires to be brought on the shoe sole, and, having suitably adjusted the parts for the first shoe of a number, all the shoes subsequently operated on will be subjected to the same pressure notwithstanding any variation in the position of the shoes on the support.

An important feature therefore of my invention is the provision of means under the control of the operator whereby he may adjust the relative position of the form and the feeler to predetermine the pressure to which the work is subjected and which pressure will be brought to bear on all the shoes operated on whilst the said adjustment is maintained.

The means whereby the operator may adjust the parts for the purpose stated may be provided with an indicator and scale so that by reference thereto he may predetermine the pressure without requiring to inspect the work.

The adjusting means are preferably of such a character as will enable the operator to subject individual shoes to greater or less pressure should this be necessary. By thus controlling the adjustment of the form, the pressing or leveling operation is greatly facilitated; the operator is relieved from having to effect frequent adjustments; time is saved and consequently the output of the machine increased; and, withal, the subjection to the same pressure of all the soles of a series or number of shoes is ensured.

A further important feature of my invention comprises a carriage to support the jack, which carriage reciprocates in a rectilineal path in timed relation with the rocklineal movement of the form whilst the sole leveling operation is proceeding and which is so actuated and controlled that when the operator is satisfied that the leveling is completed he may cause the carriage to move a further distance forwardly of the machine and thereupon the machine will be brought to stop with the jack in convenient position for the removal of the finished shoe and placing another in position, the carriage carrying a device whereby the feeler will be moved into or will be allowed to return to its normal position in readiness for the next shoe of the same size and style.

My invention also comprehends an improved shoe support which comprises relatively adjustable forepart and heel supports and means to adapt these for different lengths of lasts and an adjustable main support whereby the two former may receive desirable initial adjustment relative to the form and to the feeler according to the style and size of shoe.

I also provide means for centralizing the shoe on the jack or support of said means comprising horizontal rocking levers having shoe engaging pads on one end and engaged by a wedge block at the other end, the position of which is regulated by a screw and hand wheel.

It is in accordance with my view desirable that the shoe sole be acted on by unyielding pressure and my invention therefore further also comprehends a machine of the class defined in which the form is normally held at greatest distance from the jack, and feeler mechanism actuates controlling means whereby said form is brought more or less near to the jack and is supported unyieldingly in such automatically adjusted position or in such other position as and when the operator may effect further adjustment, all for the purposes already described. In order to reduce to a practical minimum the stress to which the machine frame and the form and jack supporting parts are subjected for a given total pressure exerted over the whole area of the shoe sole, I make the form on the periphery of a cylinder having a comparatively very short radius.

It will be generally desirable to construct the machine so that the shoe is supported sole uppermost on a jack that—by its supporting carriage—is made to reciprocate below the oscillating form, this arrangement giving the operator the best view of the work. I now propose to describe a preferred constructional form of machine which also forms an important feature of my invention although I wish it to be understood that I do not limit the scope of my invention thereto.

The preferred constructional form of my invention is illustrated in the accompanying drawings in which:—

Fig. 7 is a side elevation, partly in section, of the jack carriage reciprocating mechanism.

Within the upper part of a suitably constructed frame 1 is a sliding cross-head 2 from which depend slides that may be adjustable and which carry bearings 3 to receive the ends of a shaft 4 on which the form 5 is mounted.

So far as the forms for right and left shoes are concerned I may produce these (say by casting) on the periphery on opposite sides of a cylinder of about nine inches diameter. This enables a pair of the largest size forms (which are approximately thirteen inches long) to be made on the cylinder.

The cylinder having the right and left forms of a pair is then cut in half in the axial direction and one of these is secured for example by eccentric dowel pins 6 on a sleeve 7 which latter is mounted so as to be capable of being rocked or oscillated on the shaft 4 referred to.

Figure 4:
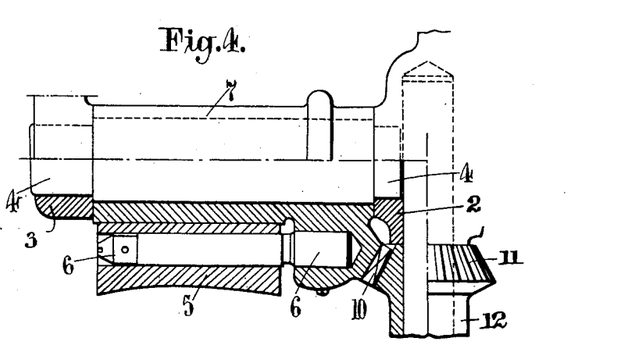
Fig. 4 is a longitudinal section of the same.
Figures 5, 8:
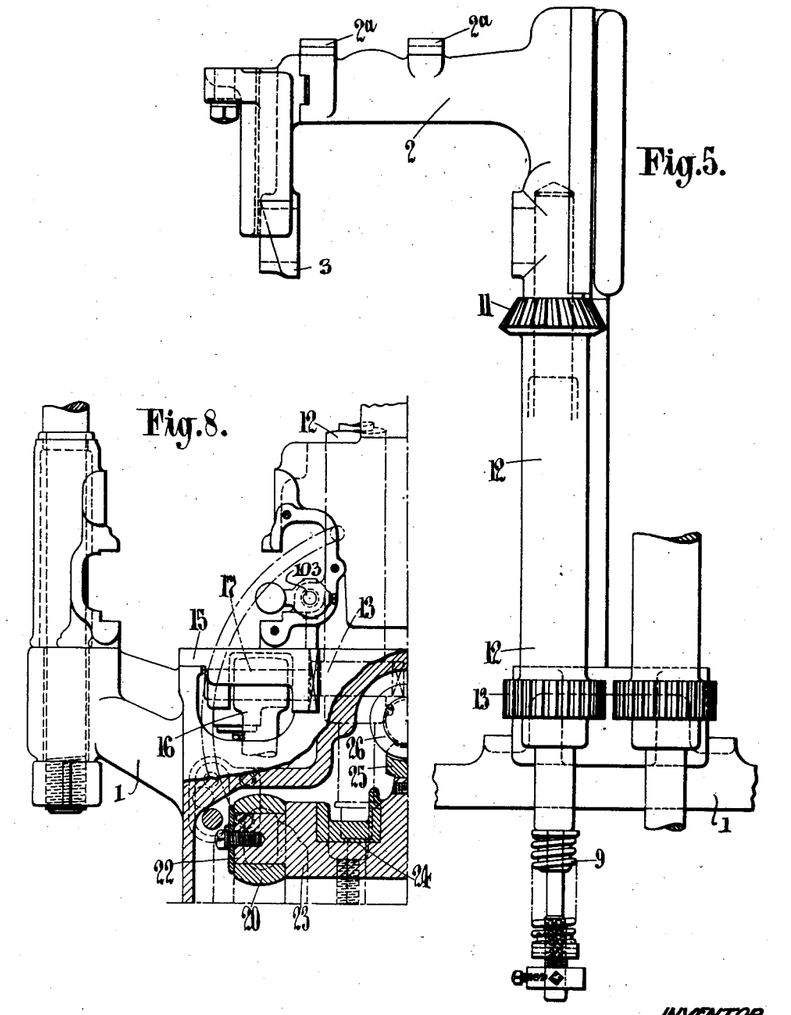
Fig. 5 is a front elevation of the cross-head and its connections.
Fig. 8 is a front elevation, partly in section, of the same.

The form, Fig. 4, is provided with bevel gear teeth 10, with which a bevel wheel 11, on a tubular vertical shaft 12, engages. The said tubular shaft is provided at its lower end with a spur gear 13, in engagement with a rack 14 on a sliding member or bar 15 to which constant reciprocating movement is imparted from a suitable source of power through operative connection such as a lever 16 connected to the rack-bar at 17 to which is connected a link 18, that swings on a pivot 19 carried by the frame 1.

About centrally of the lever 16 is connected a connecting rod 20 which is connected at its other end to a crank pin 22 on a rotary disc 23 mounted in a bearing 24. Bolted to the disc 23 is a worm-wheel 25 with which a worm 26 on shaft 27 engages. On the end of the shaft 27 are fast and loose pulleys 28, 29. (The vertical tubular shaft 12 and its pinion 13 require to be moved up and down with the former according to variations in the thickness of the work on the jack and hence the pinion is engaged with a rack having considerable width (or depth) of teeth as shown at 14ª.)

In the lower part of the frame a jack carriage 32 is provided which, by means to be described, adjustably supports a shoe 33. Said carriage is adapted to be reciprocated in a rectilineal path in timed relation with the oscillating of the sleeve 7 (and consequently the form thereon) and for this purpose the reciprocating bar 15 is periodically connected, by means to be described, to said carriage 32.

The bearings carrying the shaft 4 and parts connected up therewith, viz, the cross-head 2 and blocks 2ª thereon, are normally held, preferably by springs 9, in their highest position against an eccentric 52 to be described, and therefore furthest from the jack below it. The jack is provided with shoe supports, to be described, whereby the appropriate (right or left) shoe is held in adjusted position.

The feeler consists in a roller 35 that is carried by a block 36, pivoted at 37, to a vertically slidable rod or slide 38. The block 36 is connected at 40 by a link 41 to one arm of a bell crank bar 42, the other arm of which is connected to a vertical rod 43 which is adjustable as to length. The upper end of said rod 43 is connected at 44 to a rotary sleeve 45 on a shaft 46. Projecting from said sleeve is an arm 47 having at its free end a stop finger 48. The arrangement is such that if the feeler roller is elevated or depressed the arm 47 will be swung about the shaft 46 and the finger 48 moved up or down a distance proportionate but to an amplified extent. Means are provided (such as a pawl and ratchet device) whereby if the rod be lifted the sleeve 45 will be maintained in the position to which it has been moved. Said sleeve also has extending from it a finger, the position of which is to determine the extent of downward movement of the form. To this end I provide a shaft 50 at a convenient position (preferably above the form carrying shaft 4) and on it I fix an eccentric 52 having an arm 53 that is formed with stepped teeth 54, that is to say the teeth are progressively further from the axis of rotation of the arm.

The movement of the toothed arm 53 is brought about by the movement of the carriage towards the rear of the machine, the arrangement being such that as the end of the sole of the shoe is brought into contact with the roller 35 the latter will be raised to the highest position for the particular shoe in the machine when the highest part of its sole (usually the part about midway of the forepart) has passed under the roller. By this means the finger 48 will be made to take up a position in space correlated to said highest part of the shoe sole and thereupon the carriage will actuate, through cams or the like and if desired a roller also, a rod, the upper end of which is so connected up with the toothed arm as to swing this and bring it against the finger, the latter thus acting as a stop and determining the extent of downward movement of the form. When the carriage is again moved outwards to its starting position the parts referred to are released and the form will return to its normal position. The said movement of the carriage will also release the feeler mechanism to permit it to return to normal position.

The feeler is independently adjustable so that the operator may determine with what pressure the form shall press on the shoe sole, which pressure will of course vary with different classes of work.

For this purpose the feeler may be connected to a vertical slide 38 and by suitable links directly or indirectly with the finger carrying arm so that by turning a hand-wheel 56 or the like on spindle 57 the operator may vary the relative position of the feeler and the form and thereby regulate the degree of pressure exerted by the latter when the feeler has effected the adjustment thereof. If desired a graduated scale may be marked, at 61, on the front face of the slide housing 62 and an indicator 630 may be provided by which the operator will be guided when effecting the adjustment aforesaid.

The hand wheel 56 is mounted on a screw threaded stud 57 on which is slidably mounted a wedge block 58 which is connected to the boss of the hand-wheel by a claw 59.

The inclined surface of said wedge block engages with a corresponding surface 60 on the slide 38 referred to, the latter being maintained in contact with the wedge block 58 by a spring (not shown).

Figure 6:
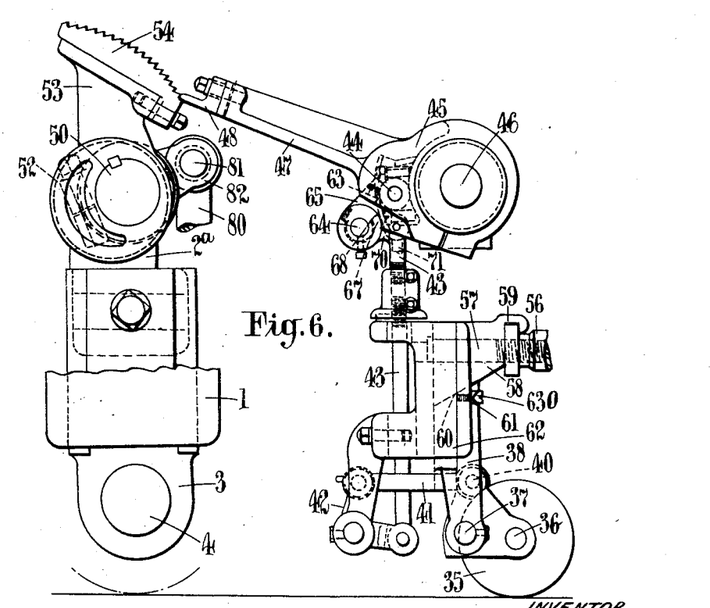
Fig. 6 is a side elevation of the feeler mechanism.

In order to maintain the finger 48 in its highest position to which it has attained when the shoe has passed completely under the feeler roll 35, I provide the sleeve 45 (see Fig. 6) with an arcuate rack 63 and adjacent thereto mounted upon a rock-shaft 64 carried in bearings in the frame is a plurality of spring pressed pawls 65 (to obtain fine adjustment)

that engage with said rack 63. In order to trip the pawls after a shoe has been completed I mount on the rock-shaft 64 a sleeve 67 that has a shoulder 68 in engagement with a corresponding shoulder on the pawls and said sleeve has an arm 70 that has connected to it a vertical rod 71 the lower end of which carries a roller 72 that rides on a cam 73 carried by the reciprocating jack carriage 32.

The jack supporting carriage, preferably supported on rollers $32^a$ provided with ball bearings, may be actuated through the intermediary of the sliding bar 15 to which reciprocating movement is imparted from a power driven shaft through worm 26 and worm wheel 25, crank connecting rod 20, and lever 16, as already described. The free end of said lever 16 is connected to said bar 15 and the bar is provided with a spring plunger 90 that has on its upper end a number of teeth 92. On the lower face of an extension on the jack carriage are provided at two parts toothed blocks 93, 94, adapted to be engaged at appropriate times by the toothed plunger 90 which latter normally tends to engage with said blocks by the action of a spring 95. The plunger 90 is provided with a stud $90^a$, on which an antifriction roll $90^b$ is mounted.

Pivotally mounted on the jack carriage at $97^a$, $98^a$, respectively, are shield bars 97, 98, the free ends of which are acted on by springs $97^b$, $98^b$, respectively, that tend to lift said bars. The bars 97, 98, are adapted to be depressed by vertical plungers 120, $120^a$, respectively, so that when the roll $90^b$ moves under the toothed block 93 (or 94) said roll (and therefore the plunger 90 also) will be depressed by the shield bar 97 (or 98) to prevent engagement of the teeth 92 with said block.

Figures 9, 10, 13:
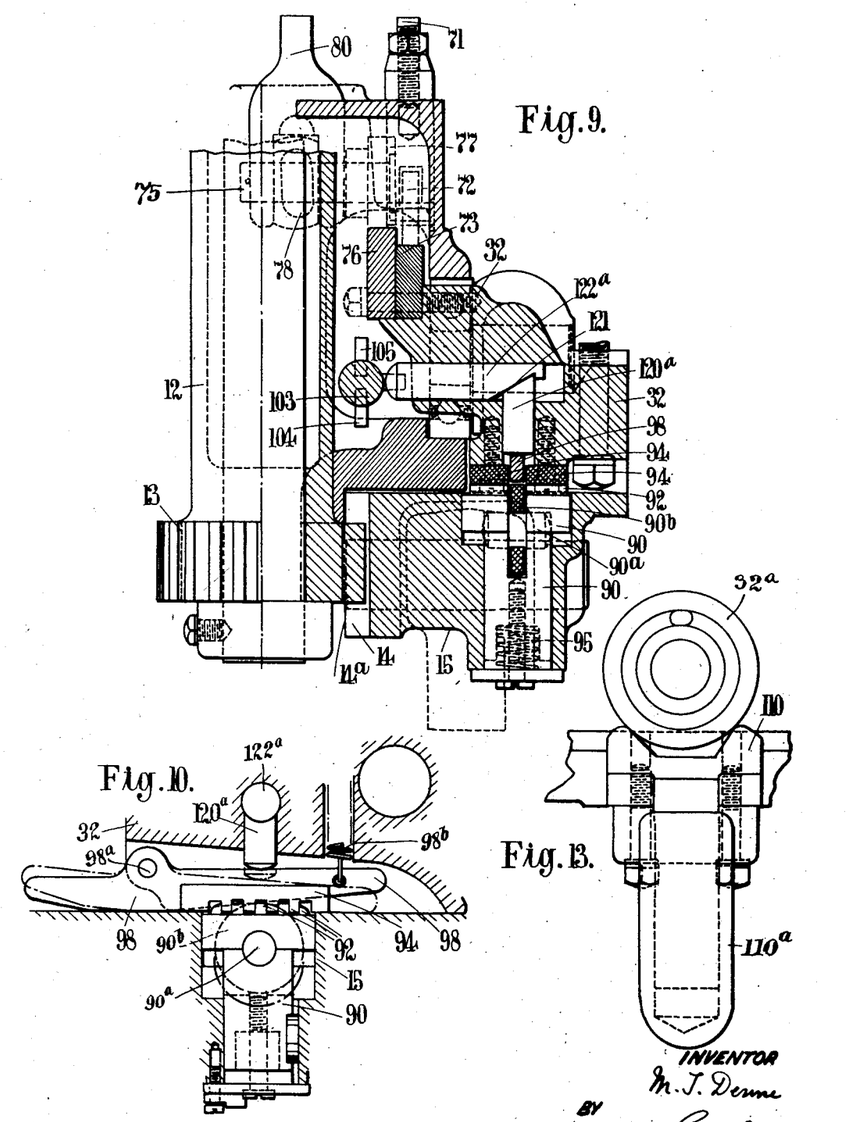
Fig. 9 is a section showing the carriage engaging devices.
Figs. 10 and 11 show details relating to the same.
Fig. 13 is a view of one of the retaining detents for the jack carriage.
Figures 11, 12:
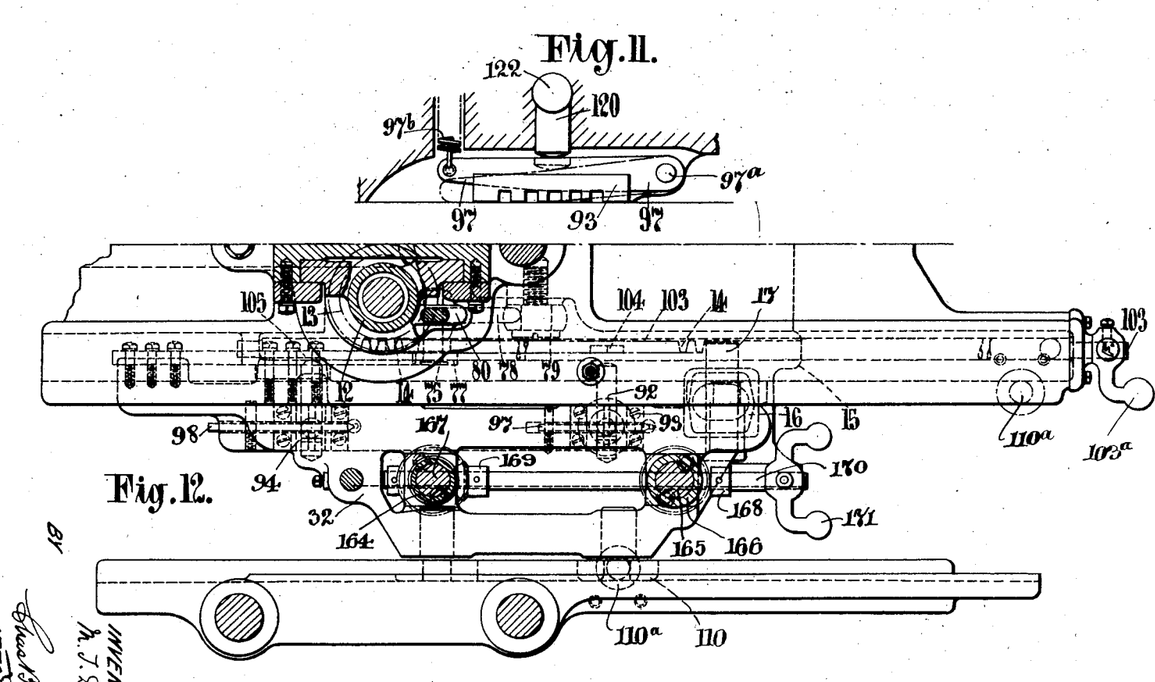
Fig. 12 is a plan view of one of the jack carriages in its bearings.
Figure 14:
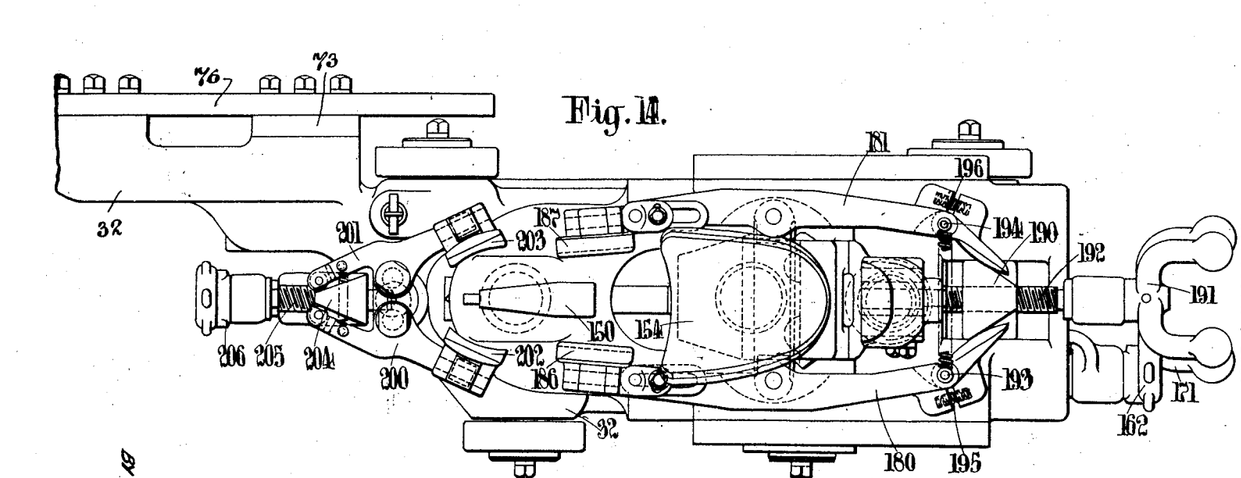
Fig. 14 is a plan view and Fig. 15 a side elevation of the jack.
Figure 15:
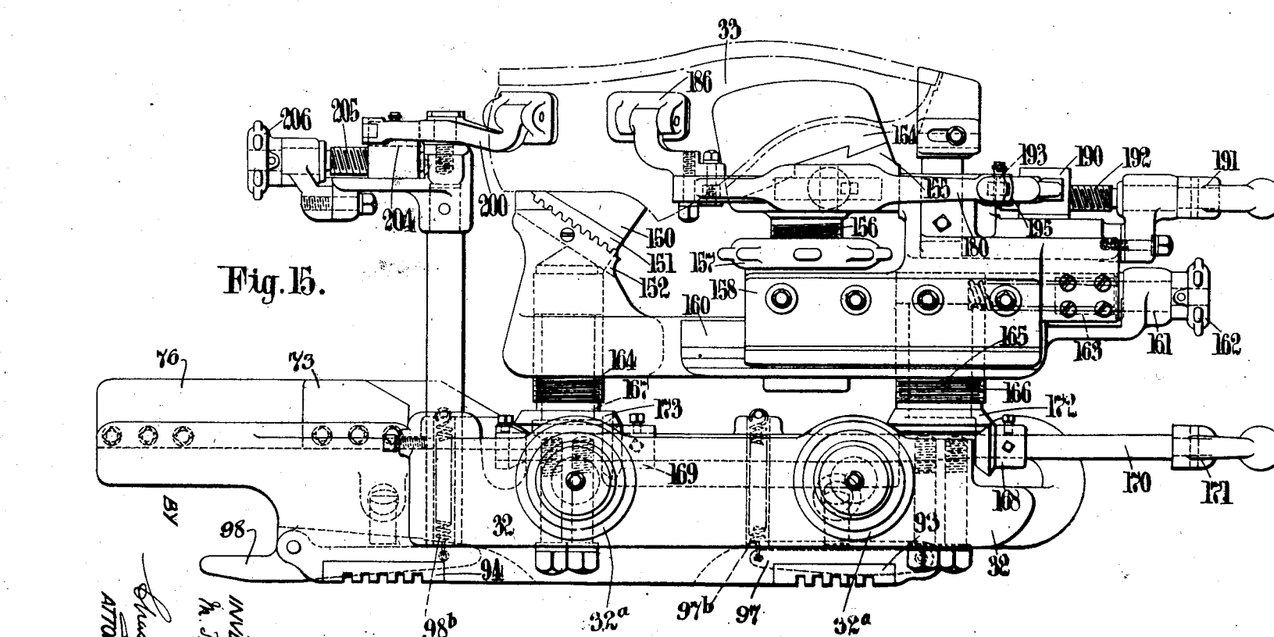

The plunger $120^a$ has an inclined upper surface 121 and is adapted to be depressed by a horizontal plunger $122^a$ that engages said surface. Plunger $122^a$ is adapted to be repressed from left to right in Fig. 9, to depress the plunger 120, by means of cams 104, 105, that are mounted on a rock-shaft 103 at an angle of 180° to each other and located apart a distance equal to the stroke of the bar 15. Shaft 103 is mounted in bearings in the machine frame and is provided with a suitable handle $103^a$, in a position convenient to the operator, whereby said shaft may be rotated. When the cams 104, 105 are moved to release the plunger $122^a$, the parts 98 and $120^a$ will be raised by the action of the spring $98^b$.

The plunger 120 may be operated by similar means (including a horizontal plunger 122) by the cam 104 referred to.

Figure 1:
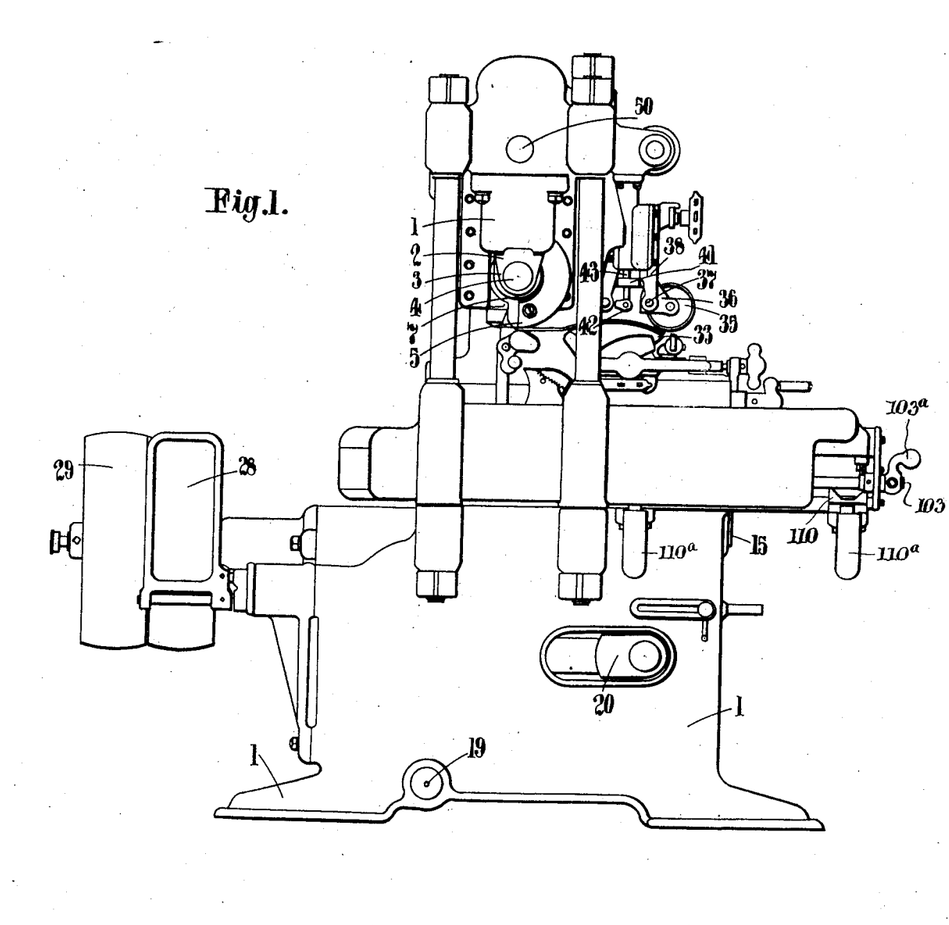
Figs. 1 and 2 are side and front elevations respectively of the complete machine.

Two spring pressed friction catches 110 are provided which are pressed upwards into the path of the carriage rollers $32^a$ by springs (not shown) contained in tubular members $110^a$ (see Figs. 1 and 13) secured to the machine frame.

When the carriage 32 is in its most forward position and is at rest (being maintained in this position by the catches 110), the cam 104 holds the shield 98 depressed (through plungers $122^a$, 120). The machine being started, the bar 15 is reciprocated, and each time the plunger 90 moves under the block 94 it is depressed by the guard 98 so that engagement of the teeth 92 with the block 94 is prevented and the carriage 32 still remains stationary. When the operator has fixed a shoe in position on the jack, he rotates the rock-shaft 103 180° in the clockwise direction, thereby removing the cam 104 from the path of the plunger $122^a$, so that the shield 98 is removed to permit the toothed plunger 90 to engage with the rearmost toothed part 94 of the jack carriage and thereby couples the bar and the carriage together so that on the next backward stroke of said bar the carriage will be carried with it to the full extent of its stroke. At the end of this stroke the heel end of the shoe sole will have just reached the form 5 without being acted on thereby and the feeler mechanism will have adjusted said form. The rotation of the shaft 103 through 180° as aforesaid will have moved the cam 105 into the path of the plunger $122^a$ so that at the end of the backward stroke of the bar 15 the shield 98 will be depressed thereby releasing the carriage 32 which is maintained in this position by one of the catches 110. When the bar 15 next reaches its most forward position, the toothed plunger 90 engages with the second or forward group of teeth 93 on the carriage and thus on its next backward stroke said bar imparts further movement to the carriage to bring the shoe under the action of the form. During this stroke the operator turns the shaft 103 in the clockwise direction through a further 90° (or if desired automatic means may be provided for doing this) so that neither of the cams 104, 105, are in the path of the plungers 122, $122^a$.

The carriage now remains coupled up with the bar 15 until the operator considers the leveling operation to be completed.

When the leveling is completed the operator turns the shaft 103 a further 90° (still in the clockwise direction) so that said shaft is now in its original position wherein the cam 104 becomes operative to cause the plunger 90 to be disconnected from the carriage when in its forward position, said carriage being retained there by one of the catches 110. The bar 15 then moves rearwardly and at the end of its movement the toothed plunger 90 will engage the rearmost and unshielded toothed block 94 on the carriage and will take the carriage with it on its next forward stroke—bringing the shoe to the clear position for removal. At the end of this stroke cam 104 causes the shield 98 to be depressed thereby disengaging plunger 90 from the block 94. The carriage is then retained in its forward position by the catch referred to whilst the finished shoe is being removed and another placed in position.

After the form has completed the leveling operation and whilst the jack carriage is moving forwardly to its normal or leading position, the finger 48 must be freed preparatory to taking up a position appropriate to the next shoe to be leveled. For this purpose I provide a cam 76 on the jack carriage 32 on which rides a roll 77 mounted on a stud 75 on the free end of a lever 78 mounted to rock on a stud 79. On the stud 75 is connected the lower end of a vertical rod 80, the upper end of which is connected to a stud 81 on an arm 82 projecting from the eccentric sleeve 52 on the shaft 50, the arrangement being such that when the rod 80 is raised it will swing the toothed arm 54 clear of the finger 48.

The shoe support may comprise a block 150 to support the heel portion of the last at its crown and which block may be adjustably supported by toothed plates 151, 152 or the like having angularly disposed engaging surfaces, means being preferably provided to maintain their engagement. The forepart rest may comprise a sort of trough shaped plate or inverted saddle 154 which also may be adjusted by toothed and angularly disposed plates 155. The two supports can thus be independently adjusted and means are preferably provided to enable them to be simultaneously raised or lowered. For adjusting the vertical position of the forepart of the shoe I provide the part 155, with a screwed stem 156, that is engaged by a hand nut 157, resting on a forepart carriage 158. The forepart carriage is slidable on a main plate 160 by a screw 161 having a hand wheel 162 and engaging in a nut 163 on the carriage.

The main plate 160 is supported by the screwed sleeves 164, 165 on guide studs 167, 166 carried by the carriage 32. The screwed sleeves 164, 165 engaged with nuts in the main plate 160 and means are provided, viz, bevel gears 168, 169 mounted on a shaft 170 having a hand wheel 171, and gearing with bevel wheels 172, 173 on said sleeves, for raising and lowering the main plate and consequently the supports thereon. If desired I may provide means for centralizing the shoe the means comprising, for example, a pair of horizontal rocking levers 180, 181 carried on the adjustable support 156 and which at one end are to engage the shoe on each side by pads 186, 187 and at their other end are controlled by a wedge block 190 the position of which may be adjusted by a hand-wheel 191 and screw 192 or the like. If desired the connection may be a yielding one by providing joints 193, 194 and springs 195, 196 between them. Further, I may provide an additional shoe support about midway between the toe and heel supports and which support may be adjustable to adapt it for various sizes and shapes of shoes.

I may also provide a heel cushion or stop comprising a pair of levers 200, 201 provided with heel pads 202, 203 and controlled by a wedge block 204 and screwed spindle 205 and hand-wheel 206, and a toe gauge by which the correct positioning of the shoe in the longitudinal direction is facilitated.

Although the operation of the various mechanisms have already been explained in detail, I now propose to describe in more general terms the complete operation of leveling a shoe.

(The bar 15 will normally be reciprocating.)

The operator first adjusts the shoe upon the jack and then turns the rock shaft 103 through an angle of 180° in the clockwise direction. The shoe is thereupon moved up to the form, the feeler mechanism at this time acting automatically to adjust the height of the form 5 according to the particular shoe in the machine. The shoe is then moved under the form 5 and the shaft 103 turned a further 90° The shoe then reciprocates under and in contact with the form until the operator deems the leveling to have been effected. He then turns the shaft 103 a further 90° whereupon the shoe is brought to a stop in the forward position, when the operator removes the shoe.

Figure 2:
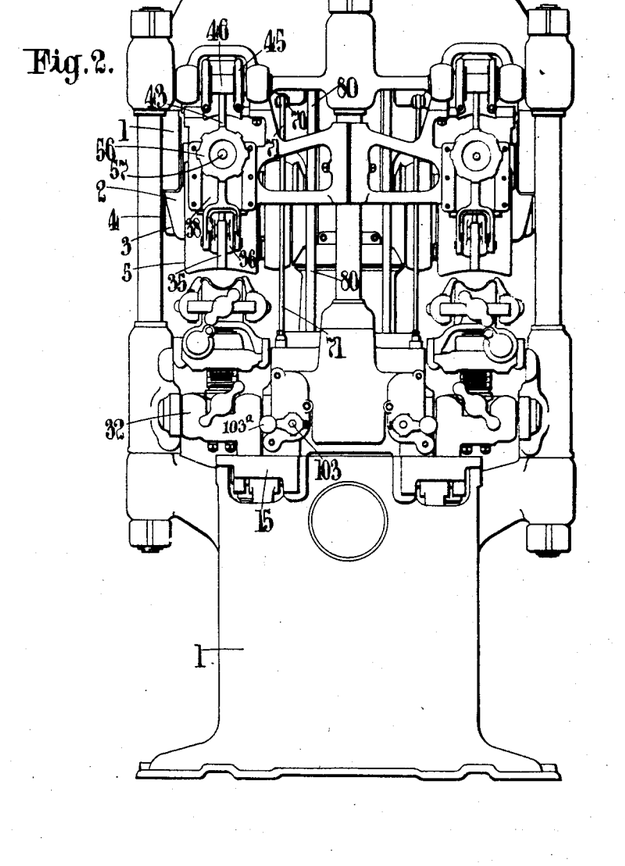
Figure 3:
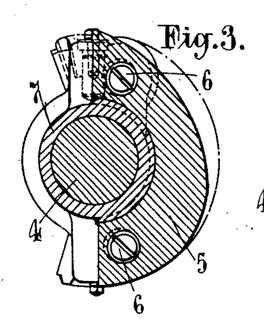
Fig. 3 is a cross-section through one of the work pressing or leveling forms and its axis.

The machine may have the mechanism in duplicate (as shown in Fig. 2) for right and left shoes so that whilst the leveling of one shoe of a pair is proceeding the operator can remove the other and finished or leveled shoe and fix a new one in position.

What I claim is:

1. For a machine of the class defined, in combination, a work support adapted for movement in a rectilineal path, a work pressing form adapted for rocking movement, and means to impart synchronized movement to said support and the form.

2. For a machine of the class defined, in combination, a work support, a rotary work pressing form, means to impart relative movement to said support and the form in a direction tangential with respect to said form, and automatic means to effect relative adjustment of said support and the form prior to the engagement of the work with the form.

3. For a machine of the class defined, in combination, a sole pressing form adapted for rocking movements, a carriage adapted for reciprocating movement, means to impart movement in timed relation to said form and said carriage, a shoe support supported on and adapted for manual adjustment with respect to said carriage, and means actuated by the shoe on said support to determine the relative position of the form and the support approximately in the plane tangential to said form.

4. For a machine of the class defined, in combination, a work pressing form, a shoe support, means under the control of the operator to regulate the relative position of said form and the support to determine the degree of pressure of the form on the work, and automatic means controlled by the shoe on said support to effect relative adjustment of the form and the support prior to the engagement of the shoe by the form.

5. For a machine of the class defined, in combination, an adjustable work pressing form, an adjustable shoe support, a feeler adapted for adjustment by contact with the work on said support, and operative connections between said feeler and said form.

6. For a machine of the class defined, in combination, a work pressing form, a work support, said form and support being adapted for relative adjustment, a feeler adapted for adjustment by contact with the work on said support, and means controlled by said feeler to effect the relative adjustment of the form and the support.

7. For a machine of the class defined, in combination, a work pressing form, a shoe support, said form and support being adapted for relative adjustment, a toothed member adapted for movement and actuated by the relative adjustment of said form and said support, and a finger adapted for movement and controlled in its movement by the work on said support, to be engaged by said toothed member.

8. For a machine of the class defined, in combination, a work pressing form, a shoe support, said form and support being adapted for relative adjustment, a feeler adapted for movement and controlled in its movement by the work on said support, an adjustable finger controlled by said feeler, and means intermediate of said finger and the form to limit the extent of relative movement of said form and the support.

9. For a machine of the class defined, in combination, an adjustable work pressing form adapted for rocking movement, a work support adapted for movement in a rectilineal path, a driven shaft, connections between said shaft and the support to move said support towards and into work pressing engagement with said form, and means, actuated by the work on said support during its movement towards the form, to adjust the position of said form.

10. For a machine of the class defined, in combination, an adjustable work pressing form adapted for rocking movement, a work support adapted for movement in a rectilineal path, a driven shaft, connections between said shaft and said support to move the latter towards the form, a feeler adapted for movement by engagement with the work on said support during its movement towards the form, and means controlled by the feeler to determine the position of the form relative to the support and to the work thereon.

11. For a machine of the class defined, in combination, an adjustable work pressing form, a shoe support adapted for movement relatively to said form, means to move said support towards, and the work thereon into engagement with, the form, an adjustable feeler adapted for movement by engagement with the work to effect the adjustment of the roll, and manually controlled means for effecting the adjustment of the feeler.

12. For a machine of the class defined, in combination, a work pressing form arranged for rocking movement, a carriage adapted for movement in a rectilineal path, a work support on said carriage, a driven shaft, a constantly reciprocating member receiving movement from said shaft and transmitting rocking movement to said form, and means to connect said member with said carriage.

13. For a machine of the class defined, in combination, a work pressing form arranged for rocking movement, a carriage adapted for movement in a path approximately tangential to said form, a work support on said carriage, a driven shaft, a constantly reciprocating member receiving movement from said shaft and transmitting rocking movement to said form, means to connect said member with the carriage, and means to vary the extent of movement of said carriage.

14. For a machine of the class defined, in combination, a work pressing form arranged for rocking movement, a carriage adapted for movement in a rectilineal path, a work support on said carriage, a driven shaft, and connections between said shaft and the carriage whereby the work on said support is moved towards and then reciprocated in synchronism with the rocking movements of said form.

15. For a machine of the class defined, in combination, an adjustable rotary work pressing form, a carriage adapted for movement in a path approximately tangential with said form, a work support on said carriage, a driven shaft, a member receiving movement from said shaft, means for connecting said member with the carriage and a feeler to adjust the position of the form and adapted for movement by engagement with the work on said support.

16. For a machine of the class defined, in combination, a rotary work pressing form, a carriage adapted for movement in a path approximately tangential with said form, a work support on said carriage, a driven shaft, a member deriving constant reciprocating movement from said shaft and normally disconnected from said carriage, means to connect said member with said carriage for imparting movement thereto, and means under the control of the operator whereby the extent of movement of the carriage may be determined.

17. For a machine of the class defined, in combination, an adjustable rotary work pressing form, a carriage adapted for movement in a path approximately tangential with said form, a work support on said carriage, a driven shaft, a member deriving reciprocating movement from said shaft and normally disconnected from said carriage, means under the control of the operator to connect said member with the carriage for imparting movement thereto, and means actuated by the work on said support to effect the adjustment of the form.

18. For a machine of the class defined, in combination, an adjustable work pressing form, a work support movable relatively to said form, a feeler adapted for movement in one direction by engagement with the work on said support, and means to restrain said feeler from movement in the opposite direction.

19. For a machine of the class defined, in combination, a work pressing form of short radius, a shaft to support said form and arranged for rocking movement, a shoe support adapted for reciprocation, a driven shaft, and means actuated by said driven shaft to impart in synchronism semi-rotational rocking movements to the form carrying shaft and reciprocating movements to the shoe support.

20. For a machine of the class defined, in combination, a work pressing form, a work support, said form and support being adapted for relative movement in one plane and adapted for adjustment in a plane transverse to the first mentioned plane, and means, adapted for movement and actuated by the work on said support to effect the adjustment relatively to each other of the form and the support.

MARK THOMAS DENNE.